Feb. 11, 1936.    G. L. LE FEVRE    2,030,175
EDUCATIONAL DEVICE
Filed Dec. 11, 1934
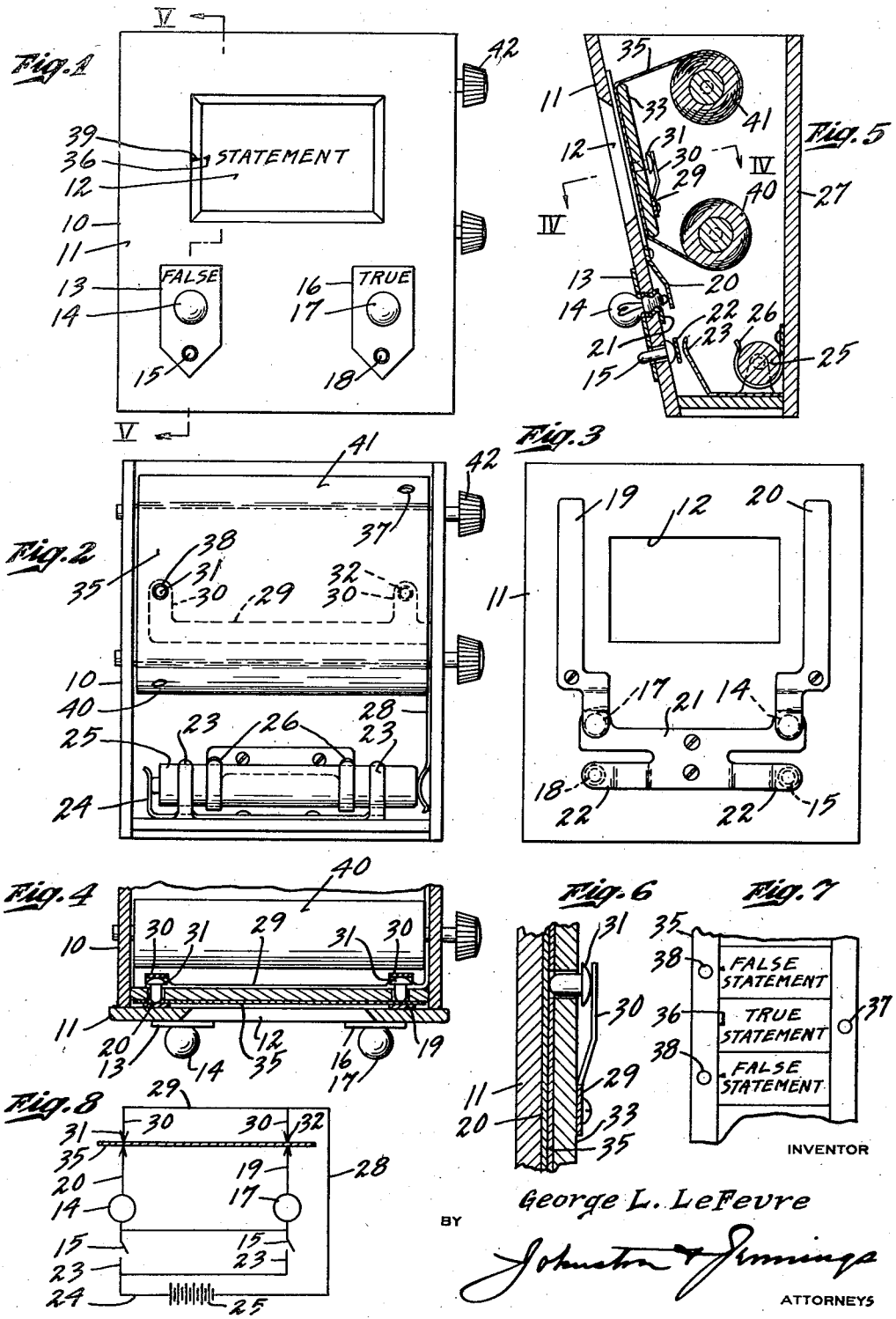
INVENTOR
George L. LeFevre
BY
Johnston & Jennings
ATTORNEYS Patented Feb. 11, 1936

2,030,175

UNITED STATES PATENT OFFICE 2,030,175

EDUCATIONAL DEVICE

George L. Le Fevre, Clarendon, Va., assignor of one-half to George A. Cook, Washington, D. C.

Application December 11, 1934, Serial No. 757,043

12 Claims. (Cl. 35—9)

My invention relates to an educational device suitable to provide both instruction and entertainment by the presentation of false and true statements, preferably indiscriminately arranged upon a tape, and associated with selective mechanism which the user operates according to his view of the truth or falsity of any statement on display and which will automatically show the correctness of such conclusion.

Various teaching devices have been heretofore provided wherein dials and like media have been provided and adapted to present questions, while answers to such questions were provided upon other dials or like media and suitable mechanism provided which would indicate when the appropriate answer is reached or found to the selected question. All of these devices require considerable mechanism and manipulation on the part of the user and in their nature are more or less restricted as to the number of questions and answers that can be utilized without substantial expense being incurred.

I have conceived that a very simple and effective educational and entertaining device can be provided which is characterized by the display of indicia such as a series of statements each of which is essentially true or false and the mechanism is adapted to permit the user to determine in his own mind the correctness or falsity of the statement displayed and to test the correctness of his conclusion, the user presses a button or like means marked "True" or "False", whereupon the device will respond with a signal capable of producing a direct and impressive reaction on the senses of the user and showing whether the statement is true or false. Thus the use of my invention can prove entertaining while at the same time it will test and improve the accuracy of the information of those using it as an educational device.

More particularly, my invention contemplates the display of the sequence of false and true statements, which term is hereinafter used as the equivalent of indicia displays, on a tape which can be of substantial length and very economically produced and distributed, the tape preferably having punch marks arranged in longitudinal columns, the punch marks opposite the true statements being arranged in one column and those opposite the false statements being arranged in another column, and the electrical indicator mechanism comprising a "true" button and a "false" button associated with circuit means such that when either is pressed a signal will be given at once indicating whether the conclusion reached with regard to the displayed statement is correct or false.

My invention further comprises the novel details of construction and arrangements of parts which in their preferred embodiment only are illustrated in the accompanying drawing and which are hereinafter more particularly described and their essential characeristics pointed out in the accompanying claims.

According to the drawing:—

Fig. 1 is a plan view of my educational device;

Fig. 2 is a similar view with the top panel removed;

Fig. 3 is a back view of the top panel;

Fig. 4 is a transverse vertical cross sectional view taken on the line IV—IV of Fig. 5;

Fig. 5 is a vertical cross sectional view taken on the broken line V—V of Fig. 1;

Fig. 6 is a detail view enlarged of a spring pressed tape controlled circuit closer pin;

Fig. 7 is a fragmental view in reduced size of a portion of the tape used in the device; and Fig. 8 is a diagrammatic layout of the electric circuits.

Similar reference numerals refer to similar parts throughout the drawing.

In the embodiment of my invention illustrated, I show the device provided with a case 10 of either metal or insulating material, preferably the latter, having an inclined hinged top panel 11 provided in its upper central portion with a transverse sight opening 12. In the lower left side of the panel 11 I mount a plate 13 provided with an opening for a flashlight bulb 14 which is typical of any other visible or audible signal. In the lower portion of this plate I mount a push button 15 and I display on this plate the word "False".

On the lower right side of the panel 11 I provide a plate 16 corresponding to 13 and carrying a light bulb 17 and a push button 18. This panel bears the word "True".

On the under face of the panel 11 I mount a pair of angled contact strips 19 and 20 which extend downwardly along each side of the sight opening 12 with their lower ends adapted to close a circuit to their respective light bulbs 14 and 17. A contact plate 21, also mounted on the back of the panel 11 carries the sockets for the bulbs and the spring switch arms 22 projecting to each side with their free ends in the path of the push buttons 15 and 18. These switch arms 22 are disposed opposite contact elements 23 carried by a conductor strip having an upturned end 24 in contact with one terminal and a source of current supply such as the flashlight battery or dry cell 25. Suitable clips 26 attached to the bottom wall 27 of the case yieldingly hold the battery in position.

A conductor 28 leads from the other battery terminal to a transverse conductor plate 29 of spring bronze or like suitable metal which has arms 30 disposed to press against two metallic circuit closing contact pins 31 and 32 which are mounted on a support 33 of insulating material extending across the case from side to side and disposed parallel with and close under the sight opening 12. The contact pin 31 is disposed to co-act as a signal switch with the conductor 20 and pin 32 as a signal switch with the conductor 19. These signal switches are arranged one on each side of the sight opening 12 and in position to engage the marginal edges of a statement display tape 35 and be held thereby normally out of circuit-closing relation with their respective switch plates 19 and 20.

The display tape is preferably in the form of a paper strip subdivided into display spaces substantially equal in size with the sight opening 12 in the case. Opposite the center of each display space on one side is an indicator mark 36 which is visible through the sight opening 12. The statements, some true and some false, are arranged discriminately on the tape, and opposite each of the true statements is a signal control means such as an aperture 37 all arranged in one aligning row of apertures and likewise for the false statements I provide an aligning row of apertures 38. Should there be occasion for it, there may be more than two rows of apertures but at least two sets of signal control means on the tape are necessary and these apertures may be treated as the equivalent of any suitable signal indicator or control means carried by the tape and adapted to complete signals indicating that the statement on display is true or false as the case may be.

These apertures are arranged in columns disposed respectively so as to pass under the signal switch pins 31 and 32 and in line with the indicator marks 36 so that when the tape is adjusted to bring one of the marks 36 opposite a mark 39 on the case, the aperture 37 or 38 for the statement on display will register with the pin 31 or 32 according to whether such statement is true or false. When this occurs the current will be passed through conductor 19 or 20 and its respective signal 14 or 17 to the conductor 21 and thence to both manually operable selective switch terminals 22, and when either of these switch terminals is pressed into contact with its respective switch terminal 23 by the pressure of its control button 15 or 18, the circuit will be completed to the battery.

The tape is mounted on any suitable roller support 40 at the lower side of the display opening 12 and is passed with a close slip fit between the cross element 33 and the panel 11 so as to present its statements successively in visible position opposite the sight opening 12 in said panel. The upper end of the strip is caught in a longitudinal slot provided in a top take-up cylinder 41 journaled in the sides of the case and operable by a knob 42. If desired, a similar knob can be applied to the lower roll 40 for the tape so that it can be reversed if desired. The panel 11 can be swung open on its hinges to permit the ready insertion and removal of the tapes.

Having assembled the device in the manner described and connected up the circuits as illustrated in Fig. 8, the operation of the device is as follows.

The strip is turned until indicators 36 and 39 are in register which presents a statement in display position beneath the opening 12. The user observes the statement but cannot see the apertures 37 and 38 and so has no assistance in determining whether the statement displayed is true or false. The user must thereupon make a decision with respect to such statement and if this decision be that the statement is false, he thereupon presses the "False" switch button 15. This will close a circuit from the battery 25 through conductor 24 to both contacts 23 and through the closed contact element 22 of the switch 15 to conductor 21 and thence to both signal lamp sockets 14 and 17. If, as a matter of fact, the statement on display be false the current will energize lamp 14 and pass along conductor 20 to the signal switch pin 31 and thence by conductors 30, 29 and 28 to the battery. This illuminates the flashlight bulb on the "False" panel 13 and signals to the user that his decision was correct. The user's attention being subconsciously fixed on the light at the button pressed, when the other light flashes he experiences a mild mental shock of surprise which impresses the error of his choice on his mind. On the other hand, had the statement on display been true instead of false, the circuit would then have been closed through lamp 17, conductor 19, signal switch pin 32 and conductors 30, 29 and 28 back to the battery, and the lamp 17 on the "True" panel 16 would have been illuminated, thereby signalling to the user that his conclusion was incorrect. Thus, as the tape is moved to present statements successively, the user is required to decide on the truth or falsity of each statement as it is displayed and to check the correctness of such conclusion by pressing the "True" or "False" button according to his or her decision so as to produce automatically a signal that will show whether the decision reached was right or wrong.

It is contemplated that by this means and very rapidly one's knowledge can be checked and tested on any subject and rolls of tape can be prepared very inexpensively dealing with a variety of subjects of study or interest and the student or user by testing his knowledge in the manner described can be both entertained and instructed by the use of my educational device.

The manner of conducting the circuits that has been shown is merely exemplary, and the use of electrical means is merely the preferred manner of operating the device, it being within the contemplation of my invention that any suitable selective manually controllable devices may be used in conjunction with appropriate tape-borne signal control devices to enable the user both to express his decision with reference to a statement and to check at once whether such decision is correct or false.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:—

1. In an educational device, a tape carrying true and false statements with one row of apertures formed therein opposite the "true" statements and another row formed therein opposite the false statements, means to manipulate the tape, electrical circuits comprising signal switches adapted to be closed when in register with said apertures, switches marked respectively "true" and "false" which are adapted to be closed selectively by hand, signals, circuits which connect said tape controlled switches and signals in multiple to said manual switches, and a source of current connected to said circuits whereby the operation of either selective switch will pass current through the closed signal switch to its respective signal.

2. In an educational device, a case having a display opening, reels to mount a strip carrying a sequence of indicia displays visible through said opening, a plurality of switches engaging said strip and normally held open thereby, apertures opposite one group of displays for controlling one switch, apertures opposite another group of displays for controlling another switch, a source of current with leads to said switches, manually operable switches and signals marked distinctively, a return lead from each strip-controlled switch through a signal and manual switch to the current source with a cross connection between the manually operable switches and the signals they respectively control.

3. In a device of the character described, a movable tape carrying a sequence of displays of factual matter with reference to each of which when on display a decision is to be made, a plurality of manually controllable switches selectively operable to express the user's decision, concealed switches and a concealed controlled means therefor movable with the tape and disposed opposite each display, a plurality of signals for conveying information relative to each decision, and electric circuits therefor, at least one of which signals is adapted to respond to the conjunctive closing of a concealed switch and a manually controllable switch in its respective control circuit.

4. In an educational device, a tape carrying a sequence of statements, some "true" and some "false", circuit selecting devices on the tape arranged in one column for the "true" statements and another column for the "false" statements, means to manipulate the tape to display said statements, a "true" and a "false" button to be selectively pressed according as a statement is considered true or false, and electric circuits, one comprising a "true" signal and another a "false" signal, adapted to be selectively closed by the operation of either of said buttons and the "true" or "false" circuit selecting device for a statement on display.

5. In an educational device, a case having a display opening, means for presenting separately in said opening a multiplicity of indicia in respect to each of which a decision is to be made, a primary signal control comprising manually operable means for expressing a decision regarding the indicia in display position, a secondary signal control comprising means associated with each indicia display, and means responsive to the joint control of said manually operable means and the indicia-bearing means to signal the correctness or incorrectness of the decision.

6. A device of the character described in claim 5, in which the indicia-bearing means is a movable tape having concealed apertures and the means responsive to the joint operation of said indicia-bearing means and the manually operable means are electric circuits which include switches selectively closed by the joint action of said apertures and the manually controllable means.

7. In an educational device, a case having a display opening, a tape carrying a multiplicity of indicia with respect to each of which a decision is to be made, a tape control means for varying the position of said tape and successively displaying said indicia, a primary signal control comprising manually controllable means for expressing the user's decision regarding the indicia on display, a secondary signal control comprising means associated with each indicia display, and means responsive to the joint operation of said manually controllable means and the tape control means for signalling the correctness or incorrectness of the user's decision.

8. In an educational device, means to display a strip, a strip carrying a sequence of displays, separate rows of concealed selectors arranged on the strip according to the correct decision for the display to which they respectively pertain, a plurality of manually controllable selective means, and means responsive to the joint control of the selector for a given display and any one of the manually controlled selective means, to signal the correctness or incorrectness of the decision made with respect to such display.

9. In an educational device, means to display a strip, a strip carrying a sequence of displays, a plurality of electrical circuits, separate rows of concealed circuit selectors arranged on the strip according to the correct decision for the display to which they respectively pertain, a plurality of switches for the selective manual control of said circuits, and means responsive to the joint control of the strip switch selector for a given display and the operated manual switch to energize said circuits and signal the correctness or incorrectness of the decision made with respect to a particular display.

10. In an educational device, a single indicia bearing means for presenting a multiplicity of indicia with respect to each of which an independent decision is to be made, indicating means for producing a plurality of positive signals, manually controllable means selectively operable in accordance with the decision made respecting a display, and concealed means for each display forming part of the indicia bearing means and adapted automatically to select the appropriate signal for the particular means on display, said indicating means being adapted to respond to the joint control of said manual and conceal means.

11. In an educational device, a tape carrying a sequence of indicia displays, means to present the displays one at a time, means manually operable to express different decisions with reference to each display, an automatic signal selector for each display on the tape, and means, controlled jointly by a signal selector on the tape and the selected manually operable means, for producing a signal affecting the senses and adapted to indicate the correctness or incorrectness of the decision selected.

12. In a device of the character described, a single indicia bearing means carrying a multiplicity of indicia with respect to each of which an independent decision is to be made, manually controllable indicating means selectively operable in accordance with the user's decision, concealed means forming a part of the indicia bearing means for modifying the manual control of said indicating means, and positive signals forming part of said indicating means which respond to the joint control of said concealed means and any one of the selected manually controllable means to indicate the correctness or incorrectness of the decision in reference to the indicia presented.

GEORGE L. LE FEVRE.